US011884414B2

(12) United States Patent
Corin et al.

(10) Patent No.: US 11,884,414 B2
(45) Date of Patent: Jan. 30, 2024

(54) SUPERSONIC AIRCRAFT TURBOFAN ENGINE

(71) Applicant: ROLLS-ROYCE plc, London (GB)

(72) Inventors: Robert J Corin, Bristol (GB); John R Whurr, Derby (GB)

(73) Assignee: ROLLS-ROYCE plc, London (GB)

(\*) Notice: Subject to any disclaimer, the term of this patent is extended or adjusted under 35 U.S.C. 154(b) by 869 days.

(21) Appl. No.: 16/451,459

(22) Filed: Jun. 25, 2019

(65) Prior Publication Data

US 2020/0023986 A1 Jan. 23, 2020

(30) Foreign Application Priority Data

Jul. 20, 2018 (GB) ...................................... 1811861

(51) Int. Cl.
*B64D 33/02* (2006.01)
*B64C 30/00* (2006.01)
(Continued)

(52) U.S. Cl.
CPC .............. *B64D 33/02* (2013.01); *B64C 30/00* (2013.01); *F02C 7/04* (2013.01); *F02K 1/08* (2013.01);
(Continued)

(58) Field of Classification Search
CPC ............. F02K 1/08; F02K 1/386; F02K 3/075
See application file for complete search history.

(56) References Cited

U.S. PATENT DOCUMENTS 3,860,361 A \* 1/1975 McMurtry ............ F01D 5/3023
416/120
4,080,785 A \* 3/1978 Koff ........................ F02K 3/06
60/226.3

(Continued)

FOREIGN PATENT DOCUMENTS

JP 2012-251542 A 12/2012
WO 2005/085620 A1 9/2005

OTHER PUBLICATIONS

Jan. 21, 2019 Search Report issued in British Patent Application No. 1811861.2.
(Continued)

*Primary Examiner* — Lorne E Meade
(74) *Attorney, Agent, or Firm* — Oliff PLC

(57) ABSTRACT

Engine has core compressor, combustor and turbine, fan located upstream of core and supersonic intake for slowing down incoming air at inlet formed by intake, bypass duct surrounding engine core, fan generates airflow to engine core and bypass airflow through bypass duct. Engine has mixer for exhaust gas flow exiting engine core, bypass airflow exiting bypass duct, thrust nozzle for discharging mixed flows, and controller for thrust produced by engine. To change level of engine thrust between transonic push operation and supersonic cruise operation, controller adjusts one or more components which vary relative areas available for hot exhaust gas flow and cold bypass airflow at mixer while holding fan inlet non-dimensional mass flow $w\sqrt{T}/P$ substantially constant, where w is mass flow of incoming air at fan inlet, T is stagnation temperature of incoming air at fan inlet and P is stagnation pressure of incoming air at fan inlet.

7 Claims, 3 Drawing Sheets

(51) Int. Cl.
*F02C 7/04* (2006.01)
*F02K 1/08* (2006.01)
*F02K 1/38* (2006.01)
*F02K 3/075* (2006.01)

(52) U.S. Cl.
CPC .............. *B64D 2033/026* (2013.01); *B64D 2033/0286* (2013.01); *F02K 1/386* (2013.01); *F02K 3/075* (2013.01); *F05D 2220/80* (2013.01); *F05D 2250/51* (2013.01)

(56) References Cited

U.S. PATENT DOCUMENTS

| | | | | |
|---|---|---|---|---|
| 4,159,625 | A * | 7/1979 | Kerr | F02K 1/17 60/204 |
| 4,285,194 | A * | 8/1981 | Nash | F02K 3/075 60/762 |
| 4,435,958 | A | 3/1984 | Klees | |
| 5,794,432 | A * | 8/1998 | Dunbar | F01D 17/162 60/204 |
| 6,318,070 | B1 * | 11/2001 | Rey | F02K 1/1207 60/226.3 |
| 8,453,458 | B2 * | 6/2013 | Whurr | F02K 3/06 60/771 |
| 2005/0045763 | A1 * | 3/2005 | Morgenstern | B64C 30/00 244/10 |
| 2016/0010590 | A1 * | 1/2016 | Rolt | F02K 1/08 60/805 |

OTHER PUBLICATIONS

Dec. 4, 2019 extended European Search Report issued in Application No. 19181975.4.

* cited by examiner

SUPERSONIC AIRCRAFT TURBOFAN ENGINE

CROSS-REFERENCE TO RELATED APPLICATIONS

This specification is based upon and claims the benefit of priority from United Kingdom patent application number GB 1811861.2 filed on Jul. 20 2018, the entire contents of which are incorporated herein by reference.

BACKGROUND

Field of the Disclosure

The present disclosure relates to a turbofan engine for a supersonic aircraft.

Description of the Related Art

There is a growing interest in the development of supersonic aircrafts for civil use. In particular, gas turbine engine systems that effectively provide thrust in subsonic, transonic and supersonic flight regimes, with reduced noise output during certain operations, are of interest.

Such engines have special adaptations relative to more conventional engines used purely for subsonic flight. For example, gas turbine engines are not designed to operate with an airflow velocity that is greater than Ma 1.0 (Ma=Mach number) for the airflow entering the engine compression section. Therefore, for supersonic flight, the inlet to the gas turbine engine must be specially shaped to slow the velocity of the airflow down to a predetermined level below Ma 1.0. More generally, the engine intake has to accelerate or decelerate the incoming air such that the non-dimensional air flow rate at the fan inlet matches that demanded by the engine cycle. For supersonic aircraft the intake must operate over a particularly wide range of inlet conditions and fan flow rates.

As to noise reduction and engine efficiency, these can both be improved compared to a pure turbojet by adopting a low or medium bypass ratio turbofan configuration. In particular, this can provide sufficiently high exhaust jet velocities for supersonic flight, while improving engine efficiency and significantly reducing noise generated by the exhaust jet.

One approach for achieving high intake performance over such a range of conditions is to provide a variable geometry intake so that the intake throat area matches the flow required by the engine. FIG. 1 shows schematically a conventional variable intake at a supersonic cruise operating condition, and FIG. 2A shows schematically the intake at a transonic push operating condition. The intake has a minimum throat area $A_{min}$ at supersonic cruise and a maximum throat area $A_{max}$ at transonic push, $A_{min}/A_{max}$ being about 0.9. This corresponds to an increase in fan inlet Mach number from about 0.56 to about 0.66. FIG. 2B is a bar chart indicating the spill drag associated with the intake at supersonic cruise, transonic push and subsonic conditions. In this example, the intake area has been matched to the streamtube area at supersonic cruise to eliminate spill drag, while at the transonic push condition the inlet is larger than the streamtube area and there is some spill drag.

The variable geometry intake requires a complex intake actuation system which adds weight and engine architecture complexity. However, without a variable geometry, the intake suffers high spill drag at operating conditions where the intake throat is too large for the engine flow rate. Alternatively, the engine suffers high intake total pressure loss if the intake throat is too small and the Mach number at the intake throat becomes excessively high or chokes. FIG. 3A shows schematically a fixed geometry intake at a supersonic cruise operating condition, the intake being too large for the fan flow, and FIG. 3B is a corresponding bar chart indicating the spill drag associated with the intake at supersonic cruise, transonic push and subsonic conditions. The fixed intake sized for peak cycle fan inlet mass flow suffers significant spill drag at many flight conditions. High spill drag greatly increases fuel burn and limits aircraft range.

It would be desirable to provide a propulsion system for a supersonic aircraft which addresses these issues.

SUMMARY OF THE DISCLOSURE

In a first aspect, the present disclosure provides a turbofan engine for providing propulsive thrust to a supersonic aircraft, the engine having:
  an engine core comprising in flow series a compressor, a combustor and a turbine;
  a fan located upstream of the engine core;
  a supersonic intake for slowing down incoming air to subsonic velocities at an inlet to the fan formed by the intake;
  a bypass duct surrounding the engine core, wherein the fan generates a core airflow to the engine core and a bypass airflow through the bypass duct;
  a mixer for mixing an exhaust gas flow exiting the engine core and the bypass airflow exiting the bypass duct;
  a thrust nozzle rearwards of the mixer for discharging the mixed flows; and
  a controller configured to control the thrust produced by the engine over a range of flight operations including relatively high thrust transonic push operation during which the aircraft transitions from subsonic to supersonic flight and relatively low thrust supersonic cruise operation;
  wherein, to change the level of engine thrust between the transonic push operation and the supersonic cruise operation, the controller varies (or is configured to vary) an area of a variable area throat of the thrust nozzle and/or adjusts (or is configured to adjust) one or more components which vary the relative areas available for the hot exhaust gas flow and the cold bypass airflow at the mixer while holding the fan inlet non-dimensional mass flow $w\sqrt{T}/P$ substantially constant, where w is the mass flow of the incoming air at the fan inlet, T is stagnation temperature of the incoming air at the fan inlet and P is stagnation pressure of the incoming air at the fan inlet.

In particular, the throat area of the thrust nozzle may be greater at the supersonic cruise operation for lower thrust and lower at the transonic push operation for greater thrust. Similarly, the relative area available at the mixer for the hot exhaust gas flow may be greater at the supersonic cruise operation for lower thrust and lower at the transonic push operation for greater thrust. Advantageously, by making such geometrical adjustments, a near or substabtially constant fan face non-dimensional mass flow can be achieved at both supersonic cruise and at higher thrust transonic conditions, thereby helping to avoid high levels of spill drag at these conditions when the constant non-dimensional mass flow is matched to a given fan inlet geometry. In general, the amount engine thrust level change that can be obtained by varying the area of the variable area throat of the thrust nozzle is greater than that which can be obtained by varying the relative areas available for the hot exhaust gas flow and the cold bypass airflow at the mixer.

In a second aspect, the present disclosure provides a supersonic aircraft having the turbofan engine according to the first aspect.

In a third aspect, the present disclosure provides a method of operating a supersonic aircraft having a turbofan engine which provides propulsive thrust to the aircraft over a range of flight operations including relatively high thrust transonic push operation during which the aircraft transitions from subsonic to supersonic flight and relatively low thrust supersonic cruise operation, the engine having:

an engine core comprising in flow series a compressor, a combustor and a turbine;
a fan located upstream of the engine core;
a supersonic intake for slowing down incoming air to subsonic velocities at an inlet to the fan formed by the intake;
a bypass duct surrounding the engine core, wherein the fan generates a core airflow to the engine core and a bypass airflow through the bypass duct;
a mixer for mixing an exhaust gas flow exiting the engine core and the bypass airflow exiting the bypass duct; and
a thrust nozzle rearwards of the mixer for discharging the mixed flows;
the method including:
performing a transonic push operation on the aircraft, the engine providing propulsive thrust a relatively high level during that operation; and
transitioning the aircraft after the transonic push operation to supersonic cruise operation and changing the engine thrust to a relatively low level by varying an area of a variable area throat of the thrust nozzle and/or adjusting one or more components which vary the relative areas available for the hot exhaust gas flow and the cold bypass airflow at the mixer while holding the fan inlet non-dimensional mass flow $w\sqrt{T}/P$ substantially constant, where w is the mass flow of the incoming air at the fan inlet, T is stagnation temperature of the incoming air at the fan inlet and P is stagnation pressure of the incoming air at the fan inlet.

Thus the method of the third aspect corresponds to the engine of the first aspect.

Optional features of the present disclosure will now be set out. These are applicable singly or in any combination with any aspect of the present disclosure.

Conveniently, the controller is an engine electronic controller (EEC) for the engine.

The intake may have a fixed geometry, i.e. such that it is not varied to control the thrust produced by the engine over the range of flight operations. As indicated above, this can help to avoid additional weight and engine architecture complexity associated with the intake.

The variable area throat of the thrust nozzle may be configured such that the change in area between its maximum area and its minimum area is at least 10% of the minimum area, and preferably is at least 15% or 20% of the minimum area.

The one or more components which vary the relative areas available for the hot exhaust gas flow and the cold bypass airflow at the mixer may be configured such that the change in relative area between the maximum relative area available at the mixer for the hot exhaust gas flow and the minimum relative area available at the mixer for the hot exhaust gas flow is at least 20% of the maximum relative area, and preferably is at least 30%, 40% or 50% of the maximum relative area. To vary the relative areas available for the hot exhaust gas flow and the cold bypass airflow at the mixer, the mixer may be a variable area mixer. Additionally or alternatively, the engine may have an adjustable outlet cone behind the turbine to vary the area available for the exhaust gas flow exiting the engine core at the mixer.

The engine may further have variable inlet guide vanes in the core airflow in front of the compressor, the angle of the variable inlet guide vanes being adjustable. In this case, to change the level of engine thrust between the transonic push operation and the supersonic cruise operation, the controller may be configured to adjust the angle of the variable inlet guide vanes to vary the relationship between fan inlet non-dimensional mass flow and fan speed. That is, the variable inlet guide vanes can be used to obtain a non-dimensional mass flow matched to a given fan inlet geometry (e.g. to improve engine efficiency at a required level of fan operability margin), which non-dimensional mass flow can then be held constant when the controller changes the level of engine thrust between the transonic push operation and the supersonic cruise operation. The variable inlet guide vanes may be configured to have an at least 30° range of adjustment angle, and preferably an at least 45° or 60° range of adjustment angle.

Additionally or alternatively, the fan may further have variable pitch fan blades, the angle of the variable pitch fan blades being adjustable. In this case, to change the level of engine thrust between the transonic push operation and the supersonic cruise operation, the controller may be configured to adjust the angle of the variable pitch fan blades to vary the relationship between fan inlet non-dimensional mass flow and fan speed. In a similar manner to the variable inlet guide vanes, the variable pitch fan blades can be used to obtain a non-dimensional mass flow matched to a given fan inlet geometry. The variable pitch fan blades may be configured to have an at least a 10° range of adjustment angle, and preferably an at least 15° or 20° range of adjustment angle.

BRIEF DESCRIPTION OF THE DRAWINGS

Embodiments of the present disclosure will now be described by way of example with reference to the accompanying drawings in which.

DETAILED DESCRIPTION OF THE DISCLOSURE

Figure 1:
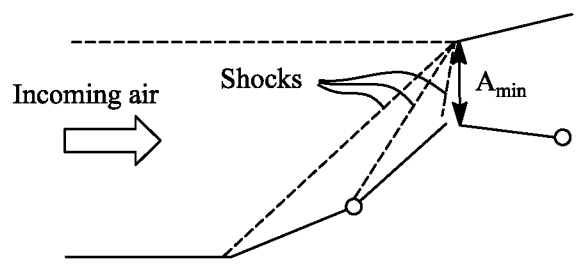
FIG. 1 shows schematically a conventional variable intake at a supersonic cruise operating condition.
Figure 2A:
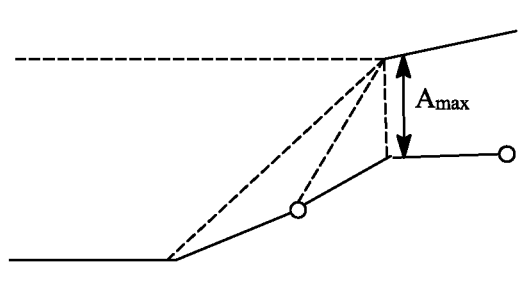
FIG. 2A shows schematically the variable intake at a transonic push operating condition.
Figure 2B:
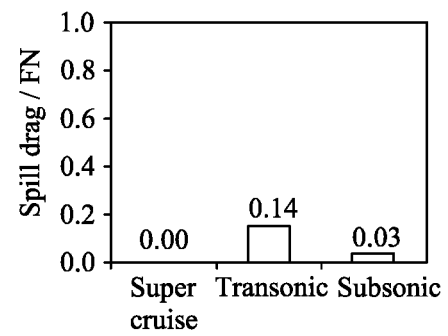
FIG. 2B is a bar chart indicating the spill drag associated with the intake at supersonic cruise, transonic push and subsonic conditions.
Figure 3A:
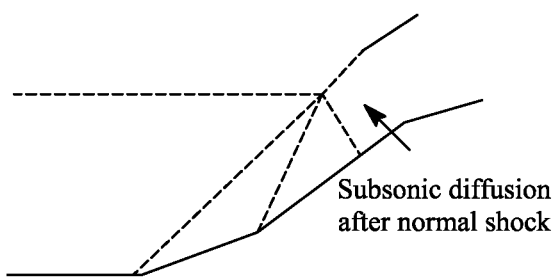
FIG. 3A shows schematically a fixed geometry intake at a supersonic cruise operating condition.
Figure 3B:
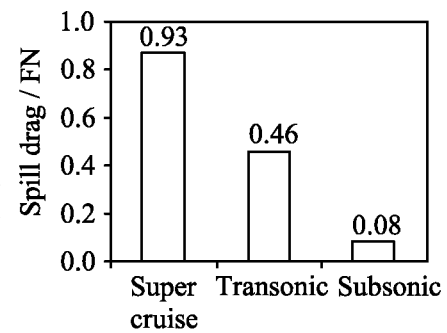
FIG. 3B is a bar chart indicating the spill drag associated with the fixed geometry intake at supersonic cruise, transonic push and subsonic conditions.
Figure 4:
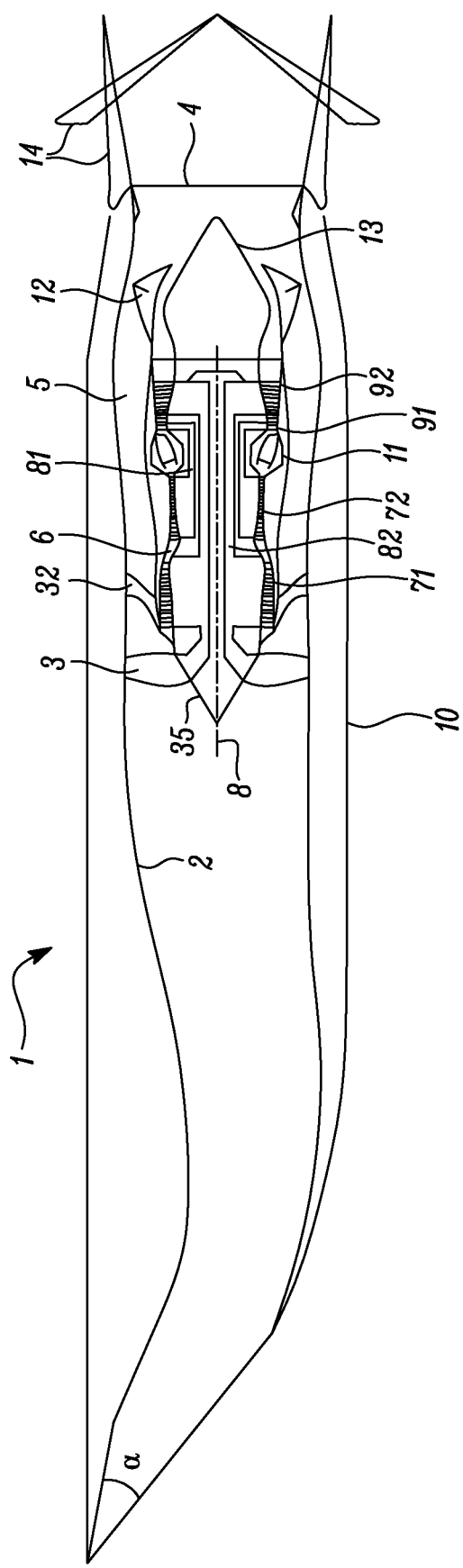
FIG. 4 shows a longitudinal cross-section through a ducted fan gas turbine main engine for supersonic flight operation of an aircraft.

FIG. 4 shows a longitudinal cross-section through a turbofan engine 1 for a civil supersonic aircraft. The turbofan engine 1 comprises an engine intake 2, a single stage fan 3 (although in other embodiments a multi-stage fan can be used), a primary flow channel 6 that leads through a engine core, a secondary flow channel 5 that leads past the engine core, a multi-lobed mixer 12, and a thrust nozzle 4 into which a thrust reverser 14 (shown in both stowed and deployed configurations) can be integrated.

The turbofan engine 1 has a machine axis or engine centre line 8. The machine axis 8 defines an axial direction of the turbofan engine. A radial direction of the turbofan engine extends perpendicularly to the axial direction.

The engine core comprises in a per se known manner a compressor 71, 72, a combustion chamber 11 and a turbine 91, 92. In the shown exemplary embodiment, the compressor comprises a booster compressor 71 and a high-pressure compressor 72. The turbine that is arranged behind the combustion chamber 11 comprises a high-pressure turbine 91 and a low-pressure turbine 92. The high-pressure turbine 91 drives a high-pressure shaft 81 that connects the high-pressure turbine 91 to the high-pressure compressor 7. The low-pressure turbine 92 drives a low-pressure shaft 82 that connects the low-pressure turbine 92 to the booster compressor 71 and the single stage fan 3.

The turbofan engine 1 is arranged inside an engine nacelle 10. It is connected to the aircraft fuselage, for example via a pylon.

The engine intake 2 forms a supersonic air inlet and is correspondingly provided and suitable for slowing down the inflowing air to velocities of below Ma 1.0. In FIG. 4, but not necessarily, the engine intake is bevelled, forming an angle α, wherein the upper edge projects with respect to the lower edge. This serves for a better distribution of compression shocks as they occur in supersonic flight. However, in principle the engine intake can be formed in a straight manner, i.e. with an angle α of 90°, or a different angle than the one shown.

Upstream, the fan 3 is provided with a nose cone 35. Behind the fan 3, the flow channel through the fan 3 is divided into the primary flow channel 6 and the secondary flow channel 5. The secondary flow channel 5 is also referred to as the bypass flow channel or the bypass channel. A fan stator 32 comprising a plurality of stator blades is located in the secondary flow channel 5 behind the fan 3.

Behind the engine core, the primary flow from the primary flow channel 6 and the secondary flow from the secondary flow channel 5 are mixed by the mixer 12. Further, an outlet cone 13 is inserted behind the turbine to realize the desired cross section of the primary flow channel.

The thrust nozzle 4 has a variable area throat, e.g. as described in United States patent applications US 2004/0006969 A1 and U.S. Pat. No. 8,453,458. Further, the mixer 12 can be a variable area mixer which allows the relative areas available for the primary flow and the bypass flow at the mixer to be adjusted, and/or the outlet cone 13 can be adjustable to vary the area available for the relative areas available for the hot exhaust gas flow and the cold bypass airflow flow exiting the engine core at the mixer, e.g. as also described in US 2004/0006969 A1 and U.S. Pat. No. 8,453,458.

Other gas turbine engines to which the present disclosure may be applied may have alternative configurations. By way of example such engines may have a different number of interconnecting shafts (e.g. one or three) and/or a different number of compressors and/or turbines. Further the engine may comprise a gearbox provided in the drive train from a turbine to a compressor and/or fan.

Figure 5:
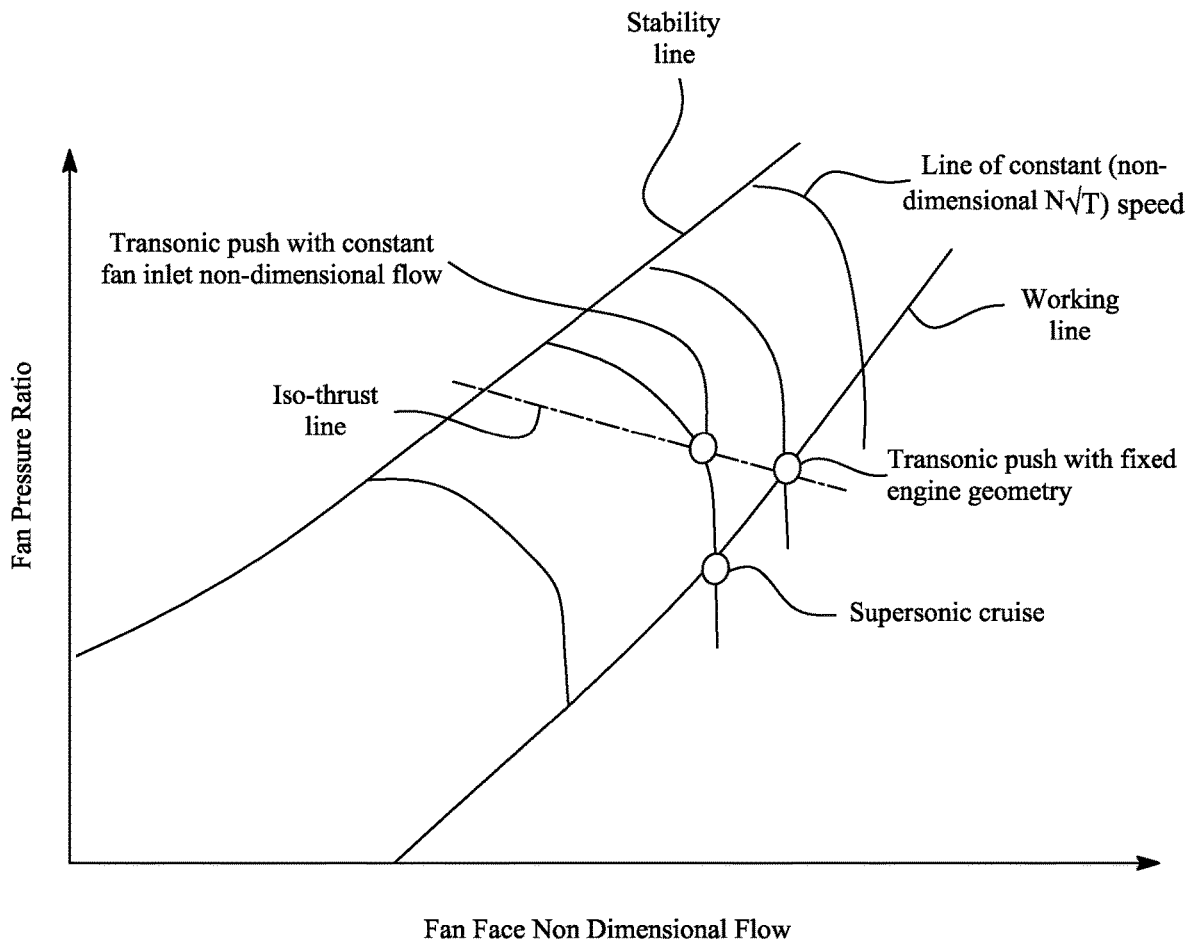
FIG. 5 shows examples of engine cycle points on a fan characteristic map which plots fan pressure ratio against fan face non-dimensional mass flow, the map plotting the fan working line, stability line and lines of constant non-dimensional fan speed.

The engine has an EEC (not shown) which controls many aspects of the engine's performance. In particular, the EEC controls the engine cycle to maintain a near or substantially constant fan face non-dimensional mass flow (w$\sqrt{T}$/P) at the fan inlet at both supersonic cruise and at higher thrust transonic push conditions, where w is the mass flow of the incoming air at the fan inlet, T is stagnation temperature of the incoming air at the fan inlet and P is stagnation pressure of the incoming air, FIG. 5 shows examples of the engine cycle points on the fan characteristic map which plots fan pressure ratio against fan face non-dimensional mass flow. The map plots the fan working line, stability line and lines of constant non-dimensional (N/$\sqrt{T}$) fan speed, N being actual fan speed.

The operating point for supersonic cruise is indicated on the working line. If no changes are made to the engine geometry, the operating point for supersonic push moves to a higher non-dimensional fan speed and higher fan pressure ratio on the working line. However, this is associated with increased spill drag. Thus to change the level of engine thrust between transonic push and the supersonic cruise operations, the EEC varies one or more variable geometry features of the engine. The engine has a fixed geometry intake 2 to avoid additional weight and reduce complexity, and so this is not variable. Instead, the EEC adjusts the area of the variable area throat of the thrust nozzle 4. The effect of this adjustment is to move the operating point for supersonic push along the iso-thrust line indicated on FIG. 5 so that the operating point is at substantially the same non-dimensional mass flow as the supersonic cruise operating point, but at a higher fan pressure ratio.

As an example, a supersonic aircraft designed to cruise at Mach 1.8 might require approximately 40 kN (9000 lbf) of thrust at supersonic cruise and a transonic thrust push of 62 kN (14000 lbf). These thrusts could be achieved by an operational cycle having a transonic fan inlet Mach number of approximately 0.65 and a ratio of cruise to transonic fan face non-dimensional flow of between 0.95 and 1. The additional transonic thrust would require an increase in fan total pressure ratio of from about 1.7 to about 1.9.

As discussed above, by using thrust nozzle throat area variability, increased transonic thrust can be achieved by reducing the thrust nozzle throat area. Specifically, reducing the throat area throttles the fan to a higher pressure ratio. The increased transonic thrust can then be achieved without an increase in fan non-dimensional flow. Such an approach may require nozzle throat area variability of at least 10%, and more typically around 20%.

Reducing the thrust nozzle throat area raises the fan working line, and may be limited by fan operability. Further thrust increases (without reducing fan operability margin or increasing fan inlet flow) can be achieved by varying the relative areas available for the hot exhaust gas flow and the cold bypass airflow at the mixer 12. Specifically, a variable mixer and/or an adjustable outlet cone 13 are deployed to increase the mixer cold stream area and reduce the mixer hot stream area. Throttling the hot core stream generates increased thrust by increasing hot stream temperature and consequently increasing jet velocity. Such an approach may require hot and cold mixer area control of at least 20% and more typically around 50%.

Thrust nozzle throat area variability and mixer relative area variability achieve higher thrust by increasing fan pressure ratio at a constant non-dimensional fan inlet flow and fan rotational speed. However, variable inlet guide vanes (VIGVs) vanes located in the primary airflow in front of the booster compressor 71, provide a means of varying the relationship between fan speed and fan inlet non-dimensional mass flow for a given fan exit flow function. VIGVs may therefore be used in combination with the variable exhaust throat area to achieve a required fan inlet non-dimensional flow at a shaft speed that better suits the low pressure turbine 92. To adequately tune the low pressure shaft speed, the VIGV angle range may be at least 30°, and more typically around 60°. Fan efficiency and operability margin are also functions of VIGV angle. The VIGV and can therefore be used to improve system efficiency at a required level of fan operability margin, while holding a constant fan inlet non-dimensional flow.

Similarly, a variable pitch fan provides a means of varying the relationship between fan speed and fan inlet non-dimensional mass flow for a given fan exit flow function. As with VIGVs, the variable pitch can be used to optimise the speed of the low pressure shaft 82 to achieve a required constant fan inlet non-dimensional flow at a shaft speed that improves system efficiency while achieving a required fan operability margin. The variable pitch fan may have at least +/−5° of pitch variability, and typically about +/−10° of pitch variability. However, if the variable pitch fans also need to generate reverse thrust, then the amount of variability may be much greater than this.

In the above engine, the thrust level on transition from transonic push operation to supersonic cruise operation is changed by adjusting the area of the variable area throat of the thrust nozzle, and optionally also the relative areas available for the hot exhaust gas flow and the cold bypass airflow at the mixer. However, in a variant engine, the thrust nozzle may have a fixed area throat, and the thrust level is changed primarily by adjusting the relative areas available for the hot exhaust gas flow and the cold bypass airflow at the mixer.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit or scope of the invention.

We claim:

1. A turbofan engine for providing propulsive thrust to a supersonic aircraft, the engine having:
   an engine core comprising in flow series a compressor, a combustor and a turbine;
   a fan located upstream of the engine core;
   a supersonic intake for slowing down incoming air to subsonic velocities at an inlet to the fan formed by the intake;
   a bypass duct surrounding the engine core, wherein the fan generates a core airflow to the engine core and a bypass airflow through the bypass duct;
   a mixer for mixing an exhaust gas flow exiting the engine core and the bypass airflow exiting the bypass duct;
   a thrust nozzle rearwards of the mixer for discharging the mixed flows; and
   a controller configured to control the thrust produced by the engine over a range of flight operations including a transonic push operation during which the aircraft transitions from subsonic to supersonic flight and a supersonic cruise operation;
   wherein, to change the level of engine thrust between the transonic push operation and the supersonic cruise operation, the controller varies an area of a variable area throat of the thrust nozzle or adjusts one or more components which vary the relative areas available for the hot exhaust gas flow and the cold bypass airflow at the mixer while holding the fan inlet non-dimensional mass flow w$\sqrt{T}$/P substantially constant, where w is the mass flow of the incoming air at the fan inlet, T is stagnation temperature of the incoming air at the fan inlet and P is stagnation pressure of the incoming air at the fan inlet.

2. The turbofan engine according to claim 1, wherein the intake has a fixed geometry.

3. The turbofan engine according to claim 1, wherein the variable area throat is configured such that the change in area between its maximum area and its minimum area is at least 10% of the minimum area.

4. The turbofan engine according to claim 1, wherein the one or more components are configured such that the change in relative area between the maximum relative area available at the mixer for the hot exhaust gas flow and the minimum relative area available at the mixer for the hot exhaust gas flow is at least 20% of the maximum relative area.

5. The turbofan engine according to claim 4, wherein the one or more components include a variable area mixer or an adjustable outlet cone located behind the turbine to vary the area available for the exhaust gas flow exiting the engine core at the mixer.

6. A supersonic aircraft having the turbofan engine according to claim 1.

7. A method of operating a supersonic aircraft having a turbofan engine which provides propulsive thrust to the aircraft over a range of flight operations including a transonic push operation during which the aircraft transitions from subsonic to supersonic flight and a supersonic cruise operation, the engine having:
   an engine core comprising in flow series a compressor, a combustor and a turbine;
   a fan located upstream of the engine core;
   a supersonic intake for slowing down incoming air to subsonic velocities at an inlet to the fan formed by the intake;
   a bypass duct surrounding the engine core, wherein the fan generates a core airflow to the engine core and a bypass airflow through the bypass duct;
   a mixer for mixing an exhaust gas flow exiting the engine core and the bypass airflow exiting the bypass duct; and
   a thrust nozzle rearwards of the mixer for discharging the mixed flows;
   the method including:
      performing a transonic push operation on the aircraft, the engine providing propulsive thrust during that operation; and
   transitioning the aircraft after the transonic push operation to supersonic cruise operation and lowering the engine thrust by varying an area of a variable area throat of the thrust nozzle or adjusting one or more components which vary the relative areas available for the hot exhaust gas flow and the cold bypass airflow at the mixer while holding the fan inlet non-dimensional mass flow w$\sqrt{T}$/P substantially constant, where w is the mass flow of the incoming air at the fan inlet, T is stagnation temperature of the incoming air at the fan inlet and P is stagnation pressure of the incoming air at the fan inlet.

* * * * *